UNITED STATES PATENT OFFICE.

ERASTUS H. MURRAY, OF ST. PAUL, MINNESOTA.

IMPROVEMENT IN FOOD FROM WHEAT AND PROCESSES OF PREPARING THE SAME.

Specification forming part of Letters Patent No. 139,600, dated June 3, 1873; application filed November 13, 1872.

*To all whom it may concern:*

Be it known that I, ERASTUS H. MURRAY, of St. Paul, in the county of Ramsey and State of Minnesota, have invented a certain improved process for preparing an article of food from wheat, and also the improvement in the article thus prepared, of which the following is a specification:

My invention consists in preparing from wheat an improved article for food similar to that known as "cracked-wheat," "wheaten-grits," &c., which I call "granulated wheat."

The wheat is first cleaned in the ordinary manner, then cracked, and then bolted to remove the flour and dust. Thus far the process is the same as in the preparation of the ordinary articles, which are then graded and ready for the market. In all such a great deal of loose bran, hulls of oats, chess, &c., is mixed with the preparation, and all the pieces of wheat have much of the inside flour, which is well known to possess little nutriment and to make the food heavy, adhering to them, and they also have much loose bran upon them.

My object is to remove all such substances, and to present each piece of wheat in the form of a grain, (as a grain of powder,) having attached to it, in most cases, a portion of the inner and outer bran. This I accomplish by an additional process to that above mentioned, viz., I pass the cracked and bolted wheat to a scourer, where it is scoured until all the loose particles of bran and the fine flour are detached from the grains, and from the scourer to a chamber, where it is submitted to a heavy blast from a fan. This effectually removes all the dirt, flour, and loose bran, and leaves a perfectly clean, granular article, possessing all the nutritious properties of the wheat, and free from all deleterious substances. It is afterward graded.

I claim as my invention—

1. As a new article of manufacture cracked wheat, possessing the uniform granular character, substantially as set forth.

2. The process of preparing the granulated wheat, by first cracking and bolting, and then scouring and fanning the same, substantially as described.

ERASTUS H. MURRAY.

Witnesses:
    H. S. FAIRCHILD,
    FRANK FAIRCHILD.